US011233690B2

(12) United States Patent
Li et al.

(10) Patent No.: US 11,233,690 B2
(45) Date of Patent: Jan. 25, 2022

(54) DATA STORAGE METHOD, NON-VOLATILE COMPUTER STORAGE MEDIUM, ELECTRONIC EQUIPMENT, SERVICE CAPABILITY EXPOSURE FUNCTION, AND BASE STATION

(71) Applicant: BAICELLS TECHNOLOGIES CO. LTD., Beijing (CN)

(72) Inventors: Ming Li, Beijing (CN); Yanguang Wu, Beijing (CN); Wei Bai, Beijing (CN); Mingyu Zhou, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 204 days.

(21) Appl. No.: 15/927,697

(22) Filed: Mar. 21, 2018

(65) Prior Publication Data
US 2018/0212816 A1    Jul. 26, 2018

Related U.S. Application Data

(63) Continuation of application No. PCT/CN2016/097289, filed on Aug. 30, 2016.

(30) Foreign Application Priority Data

Sep. 22, 2015   (CN) .......................... 201510609539.1

(51) Int. Cl.
*H04L 29/08* (2006.01)
*H04W 8/22* (2009.01)
*H04W 8/00* (2009.01)

(52) U.S. Cl.
CPC ........ *H04L 29/08666* (2013.01); *H04L 29/08* (2013.01); *H04L 29/08765* (2013.01);
(Continued)

(58) Field of Classification Search
CPC ......... H04L 29/08666; H04L 29/08801; H04L 67/20; H04L 67/2842; H04L 67/2885; H04L 67/289; G06F 16/9574
See application file for complete search history.

(56) References Cited

U.S. PATENT DOCUMENTS 8,248,931 B2    8/2012   Klein et al.
8,503,370 B2 *  8/2013   Klein ................. H04L 67/2842
                                            370/328
(Continued)

FOREIGN PATENT DOCUMENTS

CN         101291249 A      10/2008
CN         101841886 A       9/2010
(Continued)

OTHER PUBLICATIONS

European Patent Office, Extended European Search Report Issued in Application No. 16847979.8, dated Mar. 7, 2019, Germany, 8 pages.
Japanese Patent Office, Office Action Issued in Application No. 2018-533991, dated Mar. 19, 2019, 6 pages.
ISA State Intellectual Property Office of the People's Republic of China, International Search Report Issued in Application No. PCT/CN2016/097289, dated Nov. 18, 2016, WIPO, 4 pages.
(Continued)

*Primary Examiner* — Nam T Tran
(74) *Attorney, Agent, or Firm* — McCoy Russell LLP

(57) ABSTRACT

The present application provides a data storage method, a non-volatile computer storage medium, an electronic equipment, a service capability exposure function, and a base station. The method comprises: a base station receives a storage request that is used for storing a content source and is sent by a service capability exposure function, the content source coming from a third-party server; and the base station stores the content source according to the storage request. The present application solves the technical problem of long time delay in a transmission process of content source data in the prior art.

13 Claims, 5 Drawing Sheets

(52) U.S. Cl.
CPC ......... *H04L 67/20* (2013.01); *H04L 67/2833* (2013.01); *H04W 8/22* (2013.01); *H04W 8/005* (2013.01)

(56) References Cited

U.S. PATENT DOCUMENTS

| | | | |
|---|---|---|---|
| 8,775,550 B2* | 7/2014 | Jeyaseelan | H04L 67/2842 709/217 |
| 2006/0215600 A1 | 9/2006 | Chen et al. | |
| 2007/0124309 A1* | 5/2007 | Takase | G06F 16/9574 |
| 2010/0008290 A1* | 1/2010 | Fischer | H04L 67/2842 370/328 |
| 2012/0136935 A1 | 5/2012 | Tcha et al. | |
| 2013/0117549 A1* | 5/2013 | Lin | G06F 9/45541 713/2 |
| 2013/0318191 A1* | 11/2013 | Yin | H04L 67/2842 709/213 |
| 2014/0359045 A1 | 12/2014 | Mirarchi et al. | |
| 2015/0208209 A1 | 7/2015 | Jamadagni et al. | |
| 2015/0215386 A1* | 7/2015 | Walsky | G06F 9/542 709/203 |

FOREIGN PATENT DOCUMENTS

| | | |
|---|---|---|
| CN | 103631914 A | 3/2014 |
| CN | 103703747 A | 4/2014 |
| CN | 103781115 A | 5/2014 |
| CN | 104125559 A | 10/2014 |
| CN | 105306538 A | 2/2016 |
| JP | 2003281392 A | 10/2003 |
| JP | 2014531810 A | 11/2014 |
| WO | 2006046296 A1 | 5/2006 |
| WO | 2012139016 A2 | 10/2012 |
| WO | 2015076705 A1 | 5/2015 |

OTHER PUBLICATIONS

Japanese Patent Office, Office Action Issued in Application No. 2018-533991, dated Jul. 23, 2019, 6 pages.
State Intellectual Property Office of the People's Republic of China, Office Action and Search Report Issued in Application No. 201510609539.1, dated Jul. 3, 2021, 13 pages. (Submitted with Partial Translation).

* cited by examiner

DATA STORAGE METHOD, NON-VOLATILE COMPUTER STORAGE MEDIUM, ELECTRONIC EQUIPMENT, SERVICE CAPABILITY EXPOSURE FUNCTION, AND BASE STATION

CROSS-REFERENCE TO RELATED APPLICATIONS

The present application is a continuation of International Application No. PCT/CN2016/097289, filed on Aug. 30, 2016, which claims priority to Chinese Patent Application No. 201510609539.1, filed on Sep. 22, 2015, the contents of both of which are incorporated herein by reference in their entirety for all purposes.

TECHNICAL FIELD

The present application relates to the field of communications and, in particular, to a data storage method, a non-volatile computer storage medium, an electronic equipment, a service capability exposure function, and a base station.

BACKGROUND

When using existing wireless networks to get access to a video, a web page and the like, the content source is usually disposed in a third-party server. When mobile users need to get access to the content, the content needs to pass through the third-party server, a mobile core network, and a mobile access network, then gets to the user. As a result, the speed for getting access to the content is constrained by various factors in the path, which results in a relatively long delay in access to certain content and thus causes a poor user experience.

In order to solve this problem and improve the speed for getting access to the content for mobile users, mobile operators and content source providers cooperate to move the content source or its mirror image down to an edge of the mobile network, thereby decreasing the path for transmitting the content to the mobile users.

However, in the prior art, although it is possible to move the content source or its mirror image down to the edge of the mobile network, thereby reducing the time needed for transmitting the content source from the third-party server to the edge of the mobile network, the content resource still needs to pass through the mobile core network, the mobile access network and an air interface before arriving at the mobile user. The long transmission path and a long-time transmission delay lead to a poor user experience when the user gets access to the content.

As for the above problems, there is no effective solution proposed yet.

SUMMARY

Embodiments of the present application provide a data storage method, a non-volatile computer storage medium, an electronic equipment, a service capability exposure function, and a base station, so as to at least solve the technical problem of a long time delay in transmission of content source data in the prior art.

In a first aspect, the embodiments of the present application provide a data storage method, and the method includes: receiving, by a base station, a storage request for storing a content source sent by a service capability exposure function, wherein the content source comes from a third-party server; and storing, by the base station, the content source according to the storage request.

Further, before the base station receives the storage request for storing content source sent by the service capability exposure function, the method further includes: detecting, by the base station, storage space of the base station on start, and sending the detected information of the storage space to the service capability exposure function.

Further, the method includes: detecting, by the base station, storage space of the base station when the base station is restarted, and sending detected information of the storage space to the service capability exposure function; detecting, by the base station, the storage space of the base station according to a predetermined period, and sending the detected information of the storage space to the service capability exposure function; or receiving, by the base station, a query request for querying the storage space of the base station sent by the service capability exposure function, detecting the storage space of the base station according to the query request, and sending the detected information of the storage space to the service capability exposure function.

Further, after the base station stores the content source according to the storage request, the method further includes: updating, by the base station, its storage space, recorded session, and valid storage time of the content source; and canceling, by the base station, the locking on the content source when the storage time of the content source exceeds the valid storage time.

Further, after the base station stores the content source according to the storage request, the method further includes: receiving, by the base station, an update request from the service capability exposure function, wherein the update request includes at least one of a request for updating the valid storage time of the base station, a request for updating the content source, and a request for canceling the locking on the content source stored in the base station; obtaining, by the base station, a session identifier carried by the update request from the service capability exposure function; and updating, by the base station, the content source corresponding to a session identifier that matches the session identifier carried by the base station.

Further, after the base station stores the content source according to the storage request, the method further includes: counting, by the base station, the number of times that terminals access the content source within a preset time period; and canceling, by the base station, the locking on the content source when the number of times is less than a preset number.

In a second aspect, the embodiments of the present application provide a non-volatile computer storage medium storing computer-executable instructions, wherein the computer-executable instructions are configured for: receiving a storage request for storing a content source sent by a service capability exposure function, wherein the content source comes from a third-party server; and storing the content source according to the storage request.

Further, the computer-executable instructions are further configured for: before receiving the storage request for storing the content source sent by the service capability exposure function, the base station self-detects its storage space at startup, and sends the detected storage space information to the service capability exposure function.

Further, the computer-executable instructions are further configured for: detecting storage space of the base station when the base station is restarted, and sending the detected information of the storage space to the service capability exposure function; detecting storage space of the base station and sending the detected information of the storage space to the service capability exposure function according to a predetermined period; or receiving a query request for querying storage space of the base station sent by the service capability exposure function, detecting the storage space of the base station according to the query request, and sending the detected information of the storage space to the service capability exposure function.

Further, the computer-executable instructions are further configured for: after the content source is stored according to the storage request, the base station updates its storage space, recorded session and valid storage time of the content source, and cancels the locking on the content source when the storage time of the content source exceeds the valid storage time.

Further, the computer-executable instructions are further configured for: receiving an update request from the service capability exposure function after the content source is stored according to the storage request, wherein the update request includes at least one of a request for updating the valid storage time of the base station, a request for updating the content source, and a request for canceling the locking on the content source stored in the base station; obtaining a session identifier carried by the update request from the service capability exposure function; and updating the content source corresponding to a session identifier that matches the carried session identifier in the base station.

Further, the computer-executable instructions are further configured for: after the content source is stored according to the storage request, counting the number of times that terminals access the content source within a preset time period; and canceling the locking on the content source when the number of times is less than a preset number.

In a third aspect, the embodiments of the present application provide an electronic device, including at least one processor and a memory in communication with the at least one processor; wherein the memory stores instructions executable by the at least one processor, and the instructions are executed by the at least one processor, so that the at least one processor is capable of: receiving a storage request for storing a content source sent by a service capability exposure function, wherein the content source comes from a third-party server; and storing the content source according to the storage request.

Further, the at least one processor is further capable of: before receiving the storage request for storing the content source sent by the service capability exposure function, the base station self-detects its storage space at startup and sends the detected storage space information to the service capability exposure function.

Further, the at least one processor is further capable of: detecting storage space of the base station on restart of the base station, and sending the detected information of the storage space to the service capability exposure function; detecting storage space of the base station and sending the detected information of the storage space to the service capability exposure function according to a predetermined period; or receiving a query request for querying storage space of the base station sent by the service capability exposure function, detecting the storage space of the base station according to the query request, and sending the detected information of the storage space to the service capability exposure function.

Further, the at least one processor is further capable of: after the content source is stored according to the storage request, updating the storage space, recorded session, and valid storage time of the content source of the base station; and canceling, by the base station, the locking on the content source when the storage time of the content source exceeds the valid storage time.

Further, the at least one processor is further capable of: receiving an update request from the service capability exposure function after the content source is stored according to the storage request, wherein the update request includes at least one of a request for updating the valid storage time of the base station, a request for updating the content source, and a request for canceling the locking on the content source stored in the base station; obtaining the session identifier carried by the update request from the service capability exposure function; and updating the content source corresponding to a session identifier that matches the carried session identifier in the base station.

Further, the at least one processor is further capable of: after storing the content source according to the storage request, the base station counts the number of times that terminals access the content source within a preset time period and cancels the locking on the content source when the number of times is less than a preset number.

In a fourth aspect, the embodiments of the present application provide a data storage method, including: receiving, by a service capability exposure function, a storage request for storing a content source from a third-party server to a base station in a designated region; sending, by the service capability exposure function, the content source to the base station according to the storage request, and instructing the base station to store the received content source locally.

Further, the storage request carries storage information of information of the content source and/or the valid storage time of the content source, after the service capability exposure function receives the storage request for storing the content source from the third-party server to the base station in the designated region and before the service capability exposure function sends the content source to the base station according to the storage request, the method further includes: verifying, by the service capability exposure function, storage permission of the third-party server; locally storing, by the service capability exposure function, the storage information carried by the storage request when the storage permission of the third-party server passes the verification, and sending, by the service capability exposure function, the storage information stored in the service capability exposure function to the base station before or at the beginning of the valid storage time.

Further, the storage request carries information of the designated region and valid storage time of the content source, wherein the step of sending, by the service capability exposure function, the content source to the base station according to the storage request includes steps of: mapping, by the service capability exposure function, the information of the designated region to a base station list covering the designated region; and sending, by the service capability exposure function, the content source to one or more base stations corresponding to the base station list before or at the beginning of the valid storage time.

Further, the method further includes: receiving, by the service capability exposure function, information of storage space sent by the base station, or sending, by the service capability exposure function, a request for querying the storage space to the base station; and updating, by the service capability exposure function, information of storage space of the base station recorded in the service capability exposure function, after the service capability exposure function receives the information of the storage space of the base station.

Further, after the service capability exposure function sends the content source to the base station according to the storage request, the method further includes: receiving, by the service capability exposure function, an update request sent by the third-party server, wherein the update request carries at least one update information selected from a group consisting of: information of updating the designated region, information of updating valid storage time, information of updating the content source, and information of canceling locking on a content source stored in the base station; during a verification, verifying, by the service capability exposure function, storage permission of the third-party server; locally storing, by the service capability exposure function, the at least one update information carried by the update request when the storage permission of the third-party server passes the verification.

Further, when the storage permission of the third-party server passes the verification, the step of locally storing, by the service capability exposure function, the at least one update information carried by the update request includes steps of: updating, by the service capability exposure function, the base station list corresponding to the storage request according to the information of updating the designated region, after the service capability exposure function receives the information of updating the designated region; locally storing, by the service capability exposure function, valid storage time instructed by the information of updating the valid storage time, after the service capability exposure function receives the information of updating the valid storage time; and locally storing, by the service capability exposure function, a content source instructed by the information of updating the content source, after the service capability exposure function receives the information of updating the content source.

Further, after the valid storage time instructed by the information of updating the valid storage time is stored locally, the method further includes: detecting whether the content source corresponding to the information of updating the valid storage time is present in the base station; if the content source corresponding to the information of updating the valid storage time is already present in the base station, sending the valid storage time instructed by the information of updating the valid storage time to the base station; if the content source corresponding to the information of updating the valid storage time is not present in the base station, sending the valid storage time and the corresponding content source to the base station before or at the beginning of the valid storage time instructed by the information of updating the valid storage time.

Further, after the service capability exposure function receives the request for updating the designated region, and after the base station list corresponding to the storage request is updated according to the information of updating the designated region, the method further includes: the service capability exposure function comparing the updated base station list with the base station list corresponding to the storage request so as to obtain a base station(s) present only in the updated base station list or in the base station list corresponding to the storage request; the service capability exposure function determining that the base station(s) present only in the updated base station list or in the base station list corresponding to the storage request is a newly added base station added into the updated base station list or a deleted base station deleted from the base station list corresponding to the storage request; the service capability exposure function sending the information of updating the content source and/or the information of updating the valid storage time to the added base station if the service capability exposure function determines that the base station present only in the updated base station list or in the base station list corresponding to the storage request is a newly added base station; and the service capability exposure function sending the information of canceling the locking on the content source stored in the deleted base station to the deleted base station if the service capability exposure function determines that the base station present only in the updated base station list or in the base station list corresponding to the storage request is a deleted base station.

In a fifth aspect, the embodiments of the present application provide a non-volatile computer storage medium storing computer-executable instructions, wherein the computer-executable instructions are configured for: receiving a storage request for storing a content source from a third-party server into a base station in a designated region; sending the content source to the base station according to the storage request, and instructing the base station to locally store the received content source.

Further, the storage request carries storage information of information of the content source and/or the valid storage time of the content source, and the computer-executable instructions are further configured for: verifying storage permission of the third-party server, after the storage request for storing the content source from the third-party server to the base station in the designated region is received, and before the content source is sent to the base station according to the storage request; locally storing the storage information carried by the storage request when the storage permission of the third-party server passes the verification; and sending the stored information stored in the service capability exposure function to the base station before or at the beginning of the valid storage time.

Further, the storage request carries information of the designated region and valid storage time of the content source, wherein said sending the content source to the base station according to the storage request includes: mapping the information of the designated region to a base station list covering the designated region; and sending the content source to one or more base stations corresponding to the base station list before or at the beginning of the valid storage time.

Further, the computer-executable instructions are further configured for: receiving information of storage space sent by the base station, or sending a request for querying the storage space to the base station; and updating the information of the storage space of the base station recorded in the service capability exposure function, after the service capability exposure function receives the information of the storage space of the base station.

Further, after the content source is sent to the base station according to the storage request, the computer-executable instructions are further configured for: receiving an update request sent by the third-party server after the service capability exposure function sends the content source to the base station according to the storage request, wherein the update request carries at least one update information selected from a group consisting of: information of updating the designated region, information of updating valid storage time, information of updating the content source, and information of canceling locking on a content source stored in the base station; during a verification, verifying storage permission of the third-party server; and locally storing the update information carried by the update request when the storage permission of the third-party server passes the verification.

Further, when the storage permission of the third-party server passes the verification, said locally storing the update information carried by the update request includes: updating the base station list corresponding to the storage request according to the information of updating the designated region, after the service capability exposure function receives the information of updating the designated region; locally storing valid storage time instructed by the information of updating the valid storage time, after the service capability exposure function receives the information of updating the valid storage time; and locally storing a content source instructed by the information of updating the content source, after the service capability exposure function receives the information of updating the content source.

Further, the computer-executable instructions are further configured for: after the valid storage time instructed by the information of updating the valid storage time is stored locally, detecting whether the content source corresponding to the information of updating the valid storage time is present in the base station; if the content source corresponding to the information of updating the valid storage time is already present in the base station, sending the valid storage time instructed by the information of updating the valid storage time to the base station; if the content source corresponding to the information of updating the valid storage time is not present in the base station, sending the valid storage time and the corresponding content source to the base station before or at the beginning of the valid storage time instructed by the information of updating the valid storage time.

Further, the computer-executable instructions are further configured for: after the request for updating the designated region is received, and after the base station list corresponding to the storage request is updated according to the information of updating the designated region, comparing the updated base station list with the base station list corresponding to the storage request so as to obtain a base station(s) present only in the updated base station list or in the base station list corresponding to the storage request; determining that the base station(s) present only in the updated base station list or in the base station list corresponding to the storage request is a newly added base station added into the updated base station list or a deleted base station deleted from the base station list corresponding to the storage request; sending the information of updating the content source and/or the information of updating the valid storage time to the added base station if it is determined that the base station present only in the updated base station list or in the base station list corresponding to the storage request is a newly added base station; and sending the information of canceling the locking on the content source stored in the deleted base station to the deleted base station if it is determined that the base station present only in the updated base station list or in the base station list corresponding to the storage request is a deleted base station.

In a sixth aspect, the embodiments of the present application provide an electronic equipment, including: at least one processor; and a memory in communication with the at least one processor; wherein the memory stores instructions executable by the at least one processor, the instructions are executed by the at least one processor, so that the at least one processor is capable of: receiving a storage request for storing a content source sent by a service capability exposure function; sending the content source to the base station according to the storage request, and instructing the base station to locally store the content source after receiving the content source.

Further, the storage request carries storage information of information of the content source and/or the valid storage time of the content source, and the at least one processor is further capable of: during a verification, verifying storage permission of the third-party server, after the service capability exposure function receives the storage request for storing the content source from the third-party server into the base station in the designated region requesting and before the service capability exposure function sends the content source to the base station according to the storage request; locally storing the storage information carried by the storage request when the storage permission of the third-party server passes the verification, and sending the storage information stored in the service capability exposure function to the base station before or at the beginning of the valid storage time.

Further, the storage request carries information of the designated region and valid storage time of the content source, wherein said sending the content source to the base station according to the storage request includes: mapping the information of the designated region to a base station list covering the designated region; and sending the content source to one or more base stations corresponding to the base station list before or at the beginning of the valid storage time.

Further, the at least one processor is further capable of: receiving information of storage space sent by the base station, or sending a request for querying the storage space to the base station; and updating information of storage space of the base station recorded in the service capability exposure function, after the service capability exposure function receives the information of the storage space of the base station.

Further, the at least one processor is further capable of: receiving an update request sent by the third-party server after the content source is sent to the base station according to the storage request, wherein the update request carries at least one update information selected from a group consisting of: information of updating the designated region, information of updating valid storage time, information of updating the content source, and information of canceling locking on a content source stored in the base station; during a verification, verifying storage permission of the third-party server; and locally storing the update information carried by the update request when the storage permission of the third-party server passes the verification.

Further, when the storage permission of the third-party server passes the verification, said locally storing the update information carried by the update request includes: updating the base station list corresponding to the storage request according to the information of updating the designated region, after the service capability exposure function receives the information of updating the designated region; locally storing the valid storage time instructed by the information of updating the valid storage time, after the service capability exposure function receives the information of updating the valid storage time; and locally storing the content source instructed by the information of updating the content source, after the service capability exposure function receives the information of updating the content source.

Further, the at least one processor is further capable of: after the valid storage time instructed by the information of updating the valid storage time is stored locally, detecting whether the content source corresponding to the information of updating the valid storage time is present in the base station; if the content source corresponding to the information of updating the valid storage time is already present in the base station, sending the valid storage time instructed by the information of updating the valid storage time to the base station; if the content source corresponding to the information of updating the valid storage time is not present in the base station, sending the valid storage time and the corresponding content source to the base station before or at the beginning of the valid storage time instructed by the information of updating the valid storage time.

Further, the at least one processor is further capable of: after the service capability exposure function receives the request for updating the designated region, and after the base station list corresponding to the storage request is updated according to the information of updating the designated region, comparing the updated base station list with the base station list corresponding to the storage request so as to obtain a base station(s) present only in the updated base station list or in the base station list corresponding to the storage request; determining that the base station(s) present only in the updated base station list or in the base station list corresponding to the storage request is a newly added base station added into the updated base station list or a deleted base station deleted from the base station list corresponding to the storage request; sending the information of updating the content source and/or the information of updating the valid storage time to the added base station if it is determined that the base station present only in the updated base station list or in the base station list corresponding to the storage request is a newly added base station; and sending the information of canceling the locking on the content source stored in the deleted base station to the deleted base station if it is determined that the base station present only in the updated base station list or in the base station list corresponding to the storage request is a deleted base station.

In a seventh aspect, the embodiments of the present application provide a base station, including: a request receiving unit, configured for receiving a storage request for storing a content source sent by a service capability exposure function, wherein the content source comes from a third-party server; a storage unit, configured for storing the content source according to the storage request.

In an eighth aspect, the embodiments of the present application provide a service capability exposure function, including: a receiving unit, configured for receiving a storage request for storing a content source from a third-party server to a base station in a designated region; a sending unit, configured for sending the content source to the base station according to the storage request and configured for instructing the base station to locally store the content source after receiving the content source.

In the embodiments of the present application, the base station receives the storage request for storing the content source sent by the service capability exposure function, the content source coming from the third-party server; the base station stores the content source according to storage request, since the service capability exposure function can directly interact with the third-party server, the service capability exposure function sends the content source of the third-party server to the base station. The terminal can obtain the content source directly from the base station without having to obtain the content source via the mobile core network, the mobile access network and the air interface. In this way, the transmission path is shortened, the transmission delay is then decreased, thereby solving the technical problem of long-time delay in transmission of the content source data in the prior art.

BRIEF DESCRIPTION OF DRAWINGS

One or more embodiments are exemplarily illustrated with reference to the accompanying drawings while these exemplary descriptions are not intended to limit the embodiments. Elements with the same reference signs in the accompanying drawings refer to similar elements, unless otherwise noted, the figures in the accompanying drawings do not constitute a scale limitation.

DESCRIPTION OF EMBODIMENTS

In order to make those skilled in the art better understand the solutions of the present application, the technical solutions in the embodiments of the present application will be described below with reference to the accompanying drawings in the embodiments of the present application. It should be noted that, the embodiments described herein are merely a part of the embodiments of the present application. All other embodiments obtained without creative efforts by those skilled in the art on the basis of the embodiments of the present application shall fall in the protection scope of the present application.

It should be noted that, the terms "first", "second" and the like in the description, claims and the accompanying drawings of the present application are used to distinguish similar objects, but not used to describe a specific order or a sequence. It should be understood that, the data used in such ways can be interchangeable in proper situations so that the embodiments of the present application described herein can be implemented in an order other than those illustrated or described herein. Furthermore, the terms "include" and "have" and any variations thereof represent a non-exclusive inclusion, for example, a process, method, system, product, or device that includes a series of steps or units is not limited to the steps or units expressly listed herein, but may include other steps or units not expressly listed or inherent to the process, method, product or device.

Embodiment 1

The present embodiment of the present application provides a data storage method. It should be noted that, the steps shown in the flowchart of the accompanying drawing may be executed in a computer system such as a group of computer-executable instructions, besides, although the logical sequence is shown in the flowchart, in certain cases, the steps illustrated or described herein may be performed in a sequence different from the sequence herein.

Figure 1:
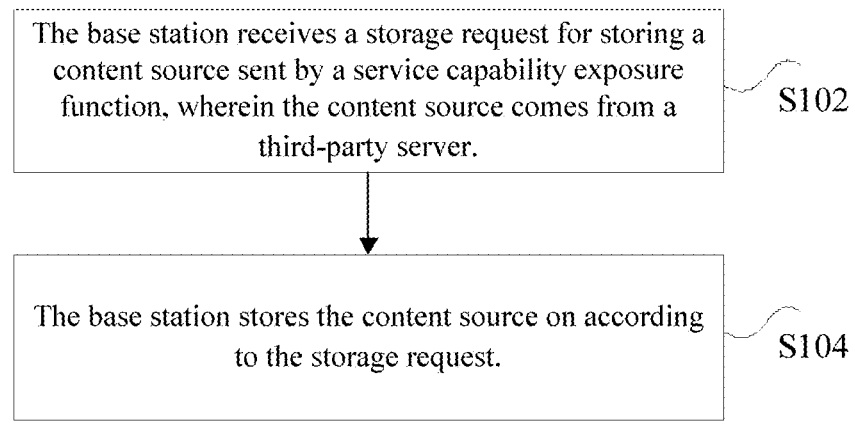
FIG. 1 illustrates a flowchart of a data storage method according to an embodiment of the present application.

FIG. 1 illustrates a flowchart of a data storage method according to the present embodiment of the present application. As shown in FIG. 1, the method includes the steps as follows.

Step S102: A base station receives a storage request for storing a content source sent by a service capability exposure function, wherein the content source comes from a third-party server.

Step S104: The base station stores the content source according to the storage request.

Figure 2:
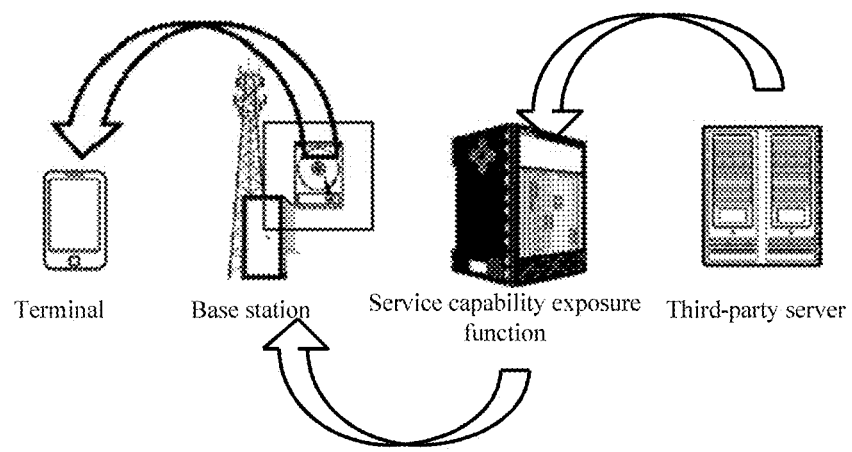
FIG. 2 illustrates a schematic diagram of an interaction among a service capability exposure function, a terminal and a server according to an embodiment of the present application.

In the standard for mobile communications, each core network element (such as HSS, MME, SGSN, etc.) interacts with a third-party server by a common network service capability exposure function. The third-party server may be a server of a third-party network application which is operated by a non-operator, or be other network entities. As shown in FIG. 2, since the service capability exposure function can directly interact with the third-party server, the service capability exposure function sends the content source of the third-party server to the base station. The terminal can obtain the content source locally from the base station without having to obtain the content source via the mobile core network, the mobile access network and the air interface. In this way, the transmission path is shortened, the transmission delay is decreased, the network load of the core network is also effectively decreased, and the operation efficiency of the core network is improved, thereby solving the technical problem existing in the prior art that long-time delay occurs when transmitting data of the content source.

For example, at the opening ceremony of the World Athletics Championships held in "Bird-Nest" stadium in Beijing on the night of August 22, the third-party server sends the content source of a video (such as a stand guide or an audience guide video) to the service capability exposure function in order to increase the speed at which the terminal loads the video. The service capability exposure function sends a request for storing the content source to the base station, and the base station stores the content source after receiving the request from the service capability exposure function. Therefore, when loading the video, the terminal can obtain the content source directly from the base station.

The service capability exposure function sends a storage request to the base station covering the "Bird-Nest" stadium, including the content source to be stored, a size of the content source, valid storage time, and the like. The base station covering the "Bird-Nest" stadium receives the storage request sent by the service capability exposure function. For example, the content to be stored is an advertisement video of sports brand A, and the valid storage time is 19:00-23:00 PM. Then, terminals within the covering scope of the base station nearby the "Bird-Nest" stadium can directly obtain the advertisement video of sports brand A from the base station between 19:00-23:00 PM.

Optionally, in order to make the base station have enough storage space for storing the content, the base station may send information with respect of the storage space to the service capability exposure function by self-detecting, or the base station may send the information with respect of the storage space after receiving a query request from the service capability exposure function. The self-detecting of the base station is to self-detect the storage space at startup and send the detected information with respect of the storage space to the service capability exposure function; or the self-detecting of the base station is to self-detect the storage space on restart and send the detected information with respect of the storage space to the service capability exposure function; or the self-detecting of the base station is to detect the storage space of the base station according to a predetermined period after the base station is started and periodically send the detected information with respect of the storage space to the service capability exposure function. The base station may detect its own storage space after receiving the query request for querying the storage space of the base station from the service capability exposure function and send the detected information with respect of the storage space to the service capability exposure function. The information with respect of the storage space includes a total storage space of the base station and a currently available storage space. When periodically detecting the storage space of the base station, a timer may be used to calculate the interval time. When the time recorded by the timer reaches the interval time, the storage space of the base station is detected and the information with respect of the storage space is sent to the service capability exposure function.

The service capability exposure function can determine whether to send a storage request to the base station according to judgment on the storage space of the base station, or the service capability exposure function can determine to send a storage request for storing what content source to the base station according to judgment on the storage space of the base station. For example, the service capability exposure function plans to send two content sources to the base station, one content source is 40 M in size, the other one is 80 M in size, and the current base station has a storage space of 50 M, the service capability exposure function sends a storage request to the base station for storing the content source with 40 M in size.

Optionally, in the method, after the base station stores the content source according to the storage request, the base station updates its storage space, recorded session, and valid storage time of the content source, and cancels locking on the content source when the storage time of the content source exceeds the valid storage time.

Each storage request carries a session identifier which can trace the third-party server, storage request, stored content, instruction information, etc., which will not be one-by-one listed herein. After storing the content source, the base station updates its storage space in time and sends information of the updated storage space to the service capability exposure function on restart, or periodically sends the information of the updated storage space to the service capability exposure function, or sends the information of the updated storage space to the service capability exposure function when the service capability exposure function queries the storage space. The base station may determine, by using the session identifier, whether the storage time of the content source belonging to a session identifier exceeds the valid storage time, and if the valid storage time is exceeded, the base station cancels the locking on the content source, that is, the content source is deleted or covered by a new content source, so that the storage space of the base station is released.

For example, the valid storage time of the advertisement video for sports brand A stored in the base station nearby the "Bird-Nest" stadium is 19:00-23:00 PM of August 22, then after 23:00 PM on August 22, the base station can delete the advertisement video for sports brand A or cover the advertisement video for sports brand A with a new content source.

Optionally, after the base station stores the content source according to the storage request, the method further includes: receiving, by the base station, an update request from the service capability exposure function, wherein the update request includes at least one of a request for updating the valid storage time of the base station, a request for updating the content source, and a request for canceling the locking on the content source stored in the base station; obtaining, by the base station, the session identifier carried in the update request from the service capability exposure function; and updating, by the base station, the content source corresponding to a session identifier in the base station that matches the carried session identifier.

After storing the content source, the base station may modify the valid storage time of the stored content source, modify the content and the size of the stored content source, or delete the content source. The base station carries a session identifier when receiving the update request, the base station also carries a session identifier when receiving the storage request, the corresponding session identifier is searched in the base station, and then the content corresponding to the session identifier is updated.

For example, the base station stores content source A whose valid storage time is 0:00 AM-24:00 PM on August 22, and whose corresponding session identifier is A1234. The base station may store the content source A before or at the beginning of the valid storage time. After the base station stores the content source A, the base station receives an update request for modifying the valid storage time of the content source A whose session identifier is A1234 and modifying the valid storage time into 8:00 AM-24:00 PM on August 22. Then the base station modifies the valid storage time corresponding to the recorded session identifier A1234 into 8:00 AM-24:00 PM on August 22, and provides the content source A to a terminal between 8:00 AM-24:00 PM on August 22. If the base station receives an update request for deleting the content source A, the base station finds the corresponding content source A according to the session identifier A1234, and then deletes the content source A. The updating with respect to the storage content is similar to the above description, which will not be further described herein.

In the embodiment, the content and size of the content source stored in the base station, the valid storage time, and the like can be modified, the content source in the base station can be deleted or covered after the valid storage time ends so as to release the storage space of the base station. The content source stored in the base station and information associated with the content source can be modified, thus increasing the flexibility of the base station in dealing with the content source.

Optionally, after the base station stores the content source according to the storage request, the method further includes: counting, by the base station, the number of times that the terminal accesses the content source within a preset time period; and canceling, by the base station, the locking on the content source when the number of times is less than a preset number.

The base station can monitor the number of times that the terminal accesses the content source within a certain period of time, that is, the number of times that the terminal obtains the content source directly from the base station. If the number of times is less than a preset number, it is determined that the content source in the base station is less frequently obtained by the terminal and is not suitable for being stored in the base station, as a result, the locking on the content source can be canceled, that is, the content source is deleted or replaced. By monitoring the number of times that the terminal accesses the content source, the content stored in the base station can be modified in time, that is, the storage capability of the base station is guaranteed, and the resource distribution of the third-party server is optimized.

Embodiment 2

Figure 3:
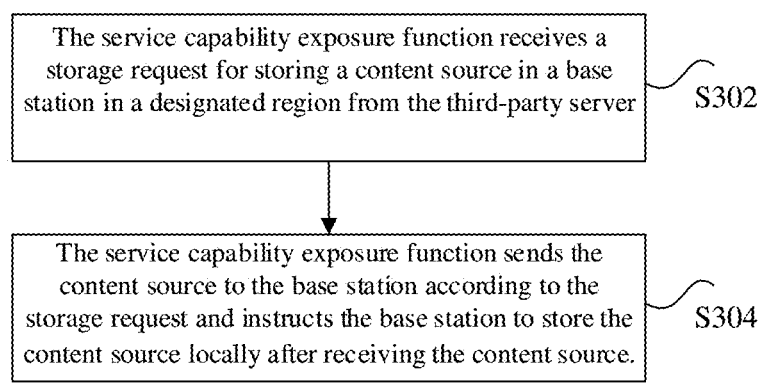
FIG. 3 illustrates a flowchart of a data storage method according to another embodiment of the present application.

The present embodiment of the present application is an embodiment of a data storage method. As shown in FIG. 3, the data storage method includes the steps as follows.

Step S302: The service capability exposure function receives a storage request for storing a content source from the third-party server into a base station in a designated region.

Step S304: The service capability exposure function sends the content source to the base station according to the storage request and instructs the base station to store the content source locally after receiving the content source.

The service capability exposure function can directly interact with the third-party server, the service capability exposure function receives the content source sent by the third-party server, and the third-party server can instruct the service capability exposure function to store the content source into a base station in a designated region. The service capability exposure function transmits the content source to the specified base station. The base station stores the content source locally, so that the terminal obtains the content source directly from the base station. Thus, there is no need for the terminal to pass through the mobile core network, the mobile access and the air interface to obtain the content source, the transmission path is shortened, and the transmission delay is decreased, thereby solving the technical problem existing in the prior art that long-time delay occurs when transmitting data of the content source.

The service capability exposure function can store the content source in the base station in the designated region, and the terminal within the region covered by the base station which stores the content source, can download the content source directly from the base station when accessing the base station, so that the transmission delay is then decreased, thereby solving the technical problem existing in the prior art that long-time delay occurs when transmitting data of the content source.

Optionally, the storage request carries storage information of the content source and/or the valid storage time of the content source. After the service capability exposure function receives the storage request for storing the content source from the third-party server into a base station in a designated region, and before the service capability exposure function sends the content source to the base station according to the storage request, the method further includes: verifying, by the service capability exposure function, storage permission of the third-party server; and locally storing, by the service capability exposure function, the storage information carried by the storage request when the storage permission of the third-party server passes the verification, wherein the service capability exposure function sends the storage information stored in service capability exposure function to the station before or at the beginning of the valid storage time.

After receiving the storage request from the third-party server, the service capability exposure function firstly verifies whether the third-party server has storage permission. The service capability exposure function can verify the storage permission of the third-party server according to the third-party server's identity identifier. The identity identifier of the third-party server having storage permission can be stored locally in the service capability exposure function, and the service capability exposure function matches the identity identifier of the server which sends the storage request with the locally stored identifier. If the matching succeeds, the server that sends the storage request passes the verification, and the content requested by the storage request is allowed to be stored in the base station. The identity identifier of the third-party server may be pre-stored locally or may be interrogated interactively by the service capability exposure function and other functional entities, and the other functional entity may be a network device storing the identity identifiers of the third-party servers having storage permission.

When receiving storage requests from multiple third-party servers, whether the multiple storage requests have conflicts with respect to the requested storage periods and the sizes of the content sources is firstly determined. If there exists a conflict, a bidding system may be used to choose the storage request to be received by the service capability exposure function. The service capability exposure function may send a notification of storage conflict to the third-party servers so as to indicate multiple third-party servers to coordinate on their own; The service capability exposure function may also send a request failure notification to the rejected third-party servers so as to indicate multiple third-party servers to change their storage strategies in time. When the third-party server passes the verification, the service capability exposure function sends a reply message to the server so as to indicate the third-party server that the verification is passed and the storing can be implemented.

During the interaction between the service capability exposure function and the third-party server, the instruction information sent to each other and the carried content sources each are identified by a session identifier. The session identifier may be an identifier carried in the storage request sent by the third-party server. Since the session identifier is transmitted along with the instruction information and the content information among the third-party server, the service capability exposure function, and the base station, it is possible to trace which server a certain content source is sent from and which instruction is aimed at which content source. An example is shown in Table 1.

TABLE 1

| Server identifier | Session identifier | Instruction | Content source |
|---|---|---|---|
| AA | a | X1-a<br>X2-a | A1-a |

Assuming that X1-a is a storage request sent by the server AA which carries a session identifier a, and the respectively stored content source is A1-a. A modification instruction X2-a for modifying the valid storage time of the content source A1-a is sent, and the modification instruction X2-a instructs to modify the valid storage time of the content source A1-a. The service capability exposure function or the base station can find the respective content source A1-a according to the session identifier a.

Optionally, the storage request carries the information of the designated region and the valid storage time of the content source and the service capability exposure function sends the content source to the base station according to the storage request. This process includes the following steps: the service capability exposure function maps the information of the designated region into a base station list covering the designated region; and the service capability exposure function sends the content source to the corresponding base station(s) in the base station list before or at the beginning of the valid storage time.

The third-party server may request that the content source be stored in a base station(s) in a designated region. After the service capability exposure function receives the information of the designated region received by the third-party server, the service capability exposure function maps the information of the designated region into the base station list covering the designated region, the base station list records the information of one or more base stations covering the designated region, such as the identifier information of the base station and the like. The service capability exposure function may send the content source to the base station in the base station list before or at the beginning of the valid storage time requested by the third-party server, so as to instruct the base station to store the content source. The content source sent by the service capability exposure function includes information with respect of the content and size of the content source. The service capability exposure function also sends information with respect of the valid storage time to the base station so that the base station can provide the content source to terminals.

Optionally, the method further includes: receiving, by the service capability exposure function, information of the storage space sent by the base station, or sending, by the service capability exposure function, a request for querying the storage space to the base station; and updating, by the service capability exposure function, the information of the storage space of the base station recorded in the service capability exposure function after the service capability exposure function obtains the information of the storage space of the base station. The service capability exposure function can obtain the information of the storage space of the base station by receiving the information of the storage space reported by the base station or actively querying the storage space of the base station, so that the service capability exposure function can determine whether the base station has the capability of storing the content source requested by the third-party server. The storage request sent by the third-party server may carry information of the size of the content source. The service capability exposure function determines whether to store the content source according to the size of the content source and the available storage space of the base station.

Optionally, after the service capability exposure function sends the content source to the base station according to the storage request, the method further includes: receiving, by the service capability exposure function, the update request sent by the third-party server, wherein the update request carries at least one piece of update information selected from the following four pieces of update information: information of updating the designated region, information of updating the valid storage time, information of updating the content source, and information of canceling the locking on the content source stored in the base station; verifying, by the service capability exposure function, the storage permission of the third-party server; and locally storing, by the service capability exposure function, the update information carried by the update request when the storage permission of the third-party server passes the verification.

The third-party server can request for modifying the information such as the content source stored in the base station and the valid storage time, and request for modifying the base station that stores the content source. After receiving the modification request sent by third-party server, the service capability exposure function firstly determines whether the third-party server has an update permission, and firstly stores the update content requested by the third-party server if the third-party server has an update permission.

For example, the third-party server makes a storage request for storing the content source in the base station in region X, and then requests for storing the content source in the base station in region Y, or the third-party server requests for canceling the stored content source in the base station in region X, or the third-party server requests for modifying the time information of the stored content source in the base station in region X, etc. The service capability exposure function can transmit the update information to the base station in time, or transmit the update information before or at the beginning of the valid storage time.

Specifically, when the storage permission of the third-party server passes the verification, the service capability exposure function locally stores the update information carried in the update request. This process includes: updating, by the service capability exposure function, the base station list corresponding to the update request after the service capability exposure function receives the information of updating the designated region; locally storing, by the service capability exposure function, the valid storage time indicated by the information of updating the valid storage time after the service capability exposure function receives the information of updating the valid storage time; and locally storing, by the service capability exposure function, the content source indicated by the information of updating the content source after the service capability exposure function receives the information of updating the content source. The locally stored valid storage time, content source and the like can be correlated with and correspond to the information requested by the storage request via the session identifier. If the update request requests for updating the designated region, the service capability exposure function updates the corresponding base station list according to the updated designated region.

Optionally, after the base station list is updated, the method further includes sending different types of update requests according to different base stations recorded in the base station list. That is, after the service capability exposure function receives the request for updating the designated region and updates the base station list corresponding to the storage request according to the information of updating the designated region, the method further includes: the service capability exposure function comparing the updated base station list with the base station list corresponding to the storage request so as to obtain a base station(s) present only in the updated base station list or in the base station list corresponding to the storage request; the service capability exposure function determining that the base station(s) present only in the updated base station list or in the base station list corresponding to the storage request is a newly added base station added into the updated base station list or a deleted base station deleted from the base station list corresponding to the storage request; the service capability exposure function sending the information of updating the content source and/or the information of updating the valid storage time to the added base station if the service capability exposure function determines that the base station present only in the updated base station list or in the base station list corresponding to the storage request is a newly added base station; and the service capability exposure function sending the information of canceling the locking on the content source stored in the deleted base station to the deleted base station if the service capability exposure function determines that the base station present only in the updated base station list or in the base station list corresponding to the storage request is a deleted base station.

For the original base station(s) which is still in the updated base station list, the information such as the valid storage time, the content and size of the content source, and the like of the original base station can be updated; and for the base station(s) newly added to the list, a storage request can be sent to the newly added base station(s) to request for storing the information such as the valid storage time, the content source, and the like. Information of canceling the locking on the stored content source is sent to the base station(s) which is absent from the updated base station and which can delete the stored content source and release its own space after receiving the information of canceling the locking, so as to store other content.

The present embodiment will be further described below with reference to Table 2 and Table 3.

TABLE 2

| Third-party server | | A | | |
|---|---|---|---|---|
| Base station | 11 | 12 | 23 | 24 |
| Content source | | M | | N |

TABLE 3

| Third-party server | | A | | |
|---|---|---|---|---|
| Base station | 11 | 12 | 25 | 24 |
| Content source | | N | | N |

As shown in Table 2, the third-party server A sends a storage request for storing the content sources in the base station 11, the base station 12, the base station 23 and the base station 24. Subsequently, the third-party server sends an update request for updating the base stations storing the content source, the base station 23 that originally stores the content source N is updated into the base station 25, and the designated region is updated to generate a new base station list, as shown in Table 3. Compared the base station list shown in Table 3 with the base station list shown in Table 2, the base station 23 is deleted from the base station list, the base station 25 is a newly added base station, and the base station 11, the base station 12 and the base station 24 are the original base stations in the station list. The service capability exposure function may update the information such as the content source, the valid storage time and the like according to the content of the update request, for example, updating the content source M stored in the base station 11 and the base station 12 into the content source N. The base station 25 is a newly added base station which can store the content source and the valid storage time in the same way of sending the storage request for the base station as mentioned above, which will not be repeated herein. The base station 23 is a deleted base station and the content source N stored therein does not need to be provided to the terminal anymore, therefore, the base station 23 can delete the content source N. The service capability exposure function can send an instruction information to the base station 23 so as to instruct the base station 23 to release the contact lock content source N of the storage space.

After sending respective update instructions to different base stations, the service capability exposure function can send the update result back to the third-party server so that the third-party server can record the update result. The third-party server may draw up a new update strategy based on the updating result so as to modify the strategy of the base station storing the content source, and the modification manner is the same as described above, which will not be repeated herein. Optionally, after instructing the base station to cancel the locking on the stored content source, the service capability exposure function maps the base station to the corresponding region information, and sends the corresponding region information to the third-party server.

Optionally, when updating the valid storage time, the timing for sending the valid storage time may be determined according to whether the base station stores the corresponding content source, that is, after the valid storage time indicated by the information of updating the valid storage time is stored locally, the method further includes: detecting whether the content source corresponding to the information of updating the valid storage time is present in the base station; if the content source corresponding to the information of updating the valid storage time is already present in the base station, sending the valid storage time indicated by the information of updating the valid storage time to the base station; if the content source corresponding to the information of updating the valid storage time is not present in the base station, sending the valid storage time indicated by the information of updating the valid storage time and the corresponding content source to the base station before or at the beginning of the valid storage time indicated by the information of updating the valid storage time.

When the content source is stored in the base station, the updated valid storage time received from the third party is sent to the base station in time. When there is no content source stored in the base station, that is, the service capability exposure function receives an update request for updating the valid storage time sent by the third-party server before the service capability exposure function sends the content source to the base station, then the service capability exposure function firstly stores the valid storage time locally. Then, the service capability exposure function transmits the valid storage time along with the content source to the base station before or at the beginning of the valid storage time when the base station has storage space. If the base station has storage space before the valid storage time begins, the content source and the valid storage time can be transmitted in advance; if the base station does not have storage space until the beginning of the valid storage time, then the content source and the valid storage time are transmitted at the beginning of the valid storage time.

The present embodiment will be described below with reference to FIG. 4.

Step S401: Reporting the storage space. The base station may actively report the storage space or report the storage space after receiving a query request sent by the service capability exposure function.

Step S402: Sending the storage request. The third-party server sends the storage request which carries the content source and the valid storage time.

Step S403: Transmitting the storage content. The service capability exposure function transmits the content source and the valid storage time sent by the third-party server to the base station.

Step S404: Requesting for the content source. The terminals directly request for the content source from the base station.

Step S405: Transmitting the content source. During the valid storage time, the base station transmits the content source to the terminals.

Step S406: Detecting the number of accesses. The base station detects whether the number of accesses reaches a lower limit, the content source in the base station is deleted if the lower limit is not reached, and the content source is kept if the lower limit is reached.

Step S407: Sending a deletion information. In the case of deleting the content source, the information of deleting the content source is sent.

Step S408: Sending an update request. The third-party server sends an update request for updating the base station, the content source, or the valid storage, etc.

Step S409: Storing the update information. The service capability exposure function locally stores the update information carried in the update request sent by the third-party server.

Step S410: Sending the update information. The update information, including the content source and/or the valid storage time, is sent before or at the beginning of the valid storage time.

Step S411: Sending an update response. The service capability exposure function informs the third-party server that the update has already been implemented, and may notify the third-party server of information of the new addition, modification, and deletion.

Figure 4:
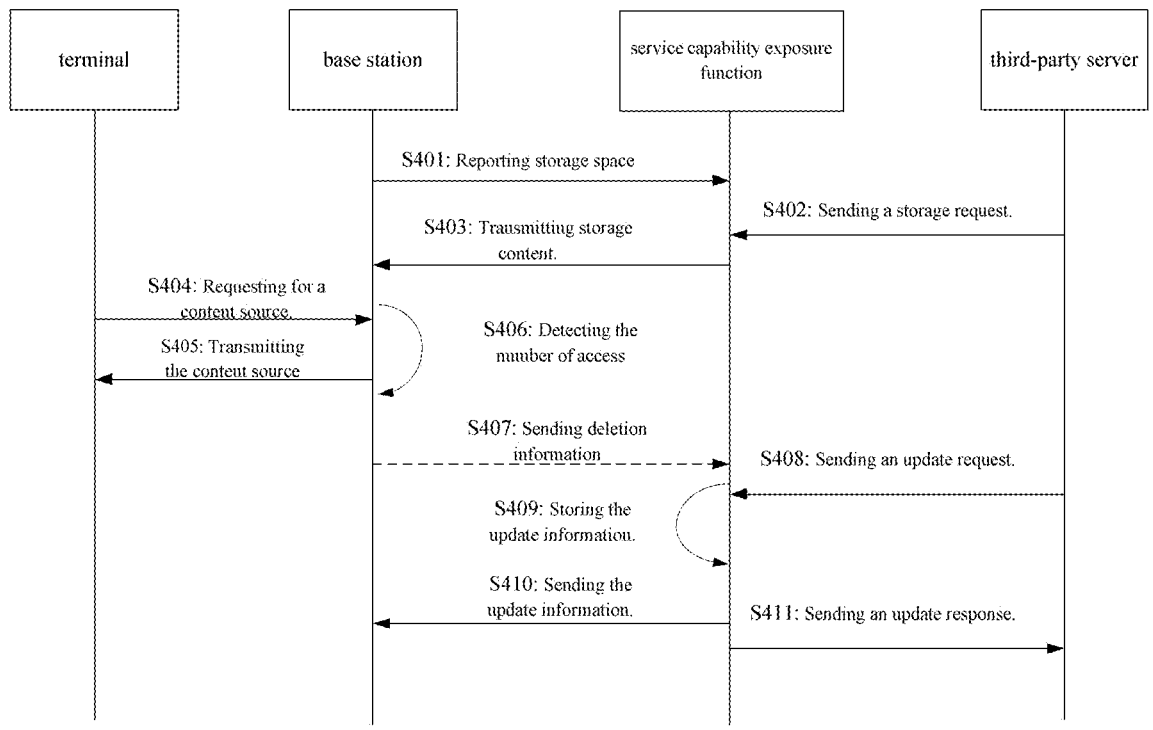
FIG. 4 illustrates a flowchart of a data storage method according to a preferred embodiment of the present application.

The embodiment shown in FIG. 4 is merely a preferred embodiment of the present application, and does not limit the implementation sequence of the steps of the present application.

With the above-described embodiment, it is possible to store the content source into the base station in the designated region so that the terminal can obtain the content directly from the base station, thereby solving the problem that the transmission delay is long in the prior art. Meanwhile, this embodiment may also specify the storage time of the content source in a certain base station, and the specified storage time may be the peak period during which the terminals access the content source, thereby improving the user experience. After the content source is stored, the valid storage time of the content source stored in the base station and the content and size of the content source can also be updated, and the base station for storing can also be changed, which improves the flexibility of storing the content source. In addition, the content source stored in the base station can also be deleted to release the storage space of the base station, thereby optimizing the storage space and reducing storage costs for the third-party server.

Figure 5:
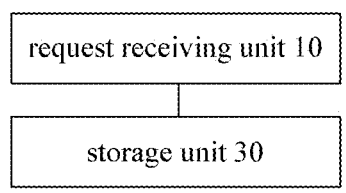
FIG. 5 illustrates a schematic diagram of a base station according to an embodiment of the present application.

The present embodiment of the present application further provides a base station. As shown in FIG. 5, the base station includes a request receiving unit 10 and a storage unit 30. The request receiving unit 10 is configured for receiving a storage request for storing the content source sent by the service capability exposure function, wherein the content source comes from the third-party server. The storage unit 30 is configured for storing the content source according to the storage request.

In the standard for mobile communications, each core network element (such as HSS, MME, SGSN, etc.) interacts with a third-party server through a common network service capability exposure function. The third-party server may be a server of a third-party application. As shown in FIG. 2, since the service capability exposure function can directly interact with the third-party server, the service capability exposure function sends the content source of the third-party server to the base station. The terminals can obtain the content source directly from the base station without having to obtain the content source via the mobile core network, the mobile access network and the air interface. In this way, the transmission path is shortened, and the transmission delay is then decreased, thereby solving the technical problem existing in the prior art that long-time delay occurs when transmitting data of the content source.

For example, at the opening ceremony of the World Athletics Championships held in "Bird-Nest" stadium in Beijing on the night of August 22, the third-party server sends the content source of a video to the service capability exposure function in order to increase the speed at which the terminal loads the video. The service capability exposure function sends a request for storing the content source to the base station, and the base station stores the content source after receiving the request from the service capability exposure function. Therefore, when loading the video, the terminal can obtain the content source directly from the base station.

The service capability exposure function sends a storage request to the base station covering the "Bird-Nest" stadium, the storage request including the content source to be stored, the size of content source, the valid storage time, and the like. The base station covering the "Bird-Nest" stadium receives the storage request sent by the service capability exposure function. For example, the content to be stored is an advertisement video of sports brand A, and the valid storage time is 19:00-23:00 PM. Then, terminals within the covering scope of the base station nearby the "Bird-Nest" stadium can directly obtain the advertisement video of sports brand A from the base station between 19:00-23:00 PM.

The service capability exposure function can determine whether to send a storage request to the base station according to the storage space of the base station, or the service capability exposure function can determine to send a storage request for storing what content source(s) to the base station according to the storage space of the base station. For example, the service capability exposure function plans to send two content sources to the base station, one content source is 40 M in size and the other one is 80 M in size, and the current base station has storage space of 50 M, the service capability exposure function sends a storage request to the base station for storing the content source with 40 M in size.

Each storage request carries a session identifier which can trace the third-party server, storage request, stored content, instruction information, etc., which will not be one-by-one listed herein. After storing the content source, the base station updates its storage space in time and sends the updated storage space to the service capability exposure function on restart, or periodically sends the updated storage space to the service capability exposure function, or sends the updated storage space to the service capability exposure function when the service capability exposure function queries the storage space. The base station may determine, by using the session identifier, whether the storage time of the content source belonging to a session identifier exceeds the valid storage time, and if the valid storage time is exceeded, the base station cancels the locking on the content source, that is, the content source is deleted or covered by a new content source, so that the storage space of the base station is released.

For example, the valid storage time of the advertisement video for sports brand A stored by the base station nearby the "Bird-Nest" stadium is 19:00-23:00 PM on August 22, then after 23:00 PM on August 22, the base station can delete the advertisement video for sports brand A or cover the advertisement video for sports brand A with a new content source.

After storing the content source, the base station can modify the valid storage time of the stored content source, modify the content and the size of the stored content source, or delete the content source. The base station carries a session identifier when receiving the update request, the base station also carries a session identifier when receiving the storage request, the corresponding session identifier is searched in the base station, and then the content corresponding to the session identifier is updated.

For example, the base station stores content source A, and its valid storage time is 0:00 AM-24:00 PM on August 22, and the corresponding session identifier is A1234. The base station may store the content source A before or at the beginning of the valid storage time. After the base station stores the content source A, the base station receives an update request for modifying the valid storage time of the content source A having the session identifier A1234 into 8:00 AM-24:00 PM on August 22. Then the base station modifies the valid storage time corresponding to the recorded session identifier A1234 into 8:00 AM-24:00 PM on August 22, and the base station provides the content source A for terminals between 8:00 AM-24:00 PM on August 22. If the base station receives an update request for deleting the content source A, the base station finds the corresponding content source A according to the session identifier A1234, and then deletes the content source A. The updating with respect to the storage content is similar to the above description, which will not be repeated herein.

In the present embodiment, the content and size of the content source stored in the base station, the valid storage time, and the like can be modified, the content source in the base station can be deleted or covered after the valid storage time ends so as to release the storage space of the base station. The content source and its associated information stored in the base station can be modified, thus increasing the flexibility of the base station in dealing with the content source.

The base station can monitor the number of times that the terminals accesses the content source within a certain period of time, that is, the number of times that the terminals obtain the content source directly from the base station. If the number of times is less than a preset value, it indicates that the content source in the base station is less frequently obtained by the terminals and is not suitable for being stored in the base station, as a result, the locking on the content source can be canceled, that is, the content source is deleted or replaced. By monitoring the number of times that terminals access the content source, the content stored in the base station can be modified in time, which maintains the storage capability of the base station and optimize the resource distribution of the third-party server.

Figure 6:
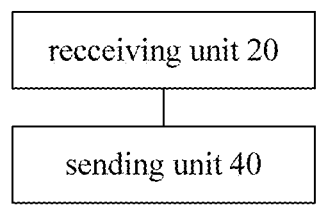
FIG. 6 illustrates a schematic diagram of a service capability exposure function according to an embodiment of the present application.

The present embodiment of the present application further provides a service capability exposure function. As shown in FIG. 6, the service capability exposure function includes a receiving unit 20 and a sending unit 40. The receiving unit 20 is configured to receive a storage request for storing a content source from a third-party server into a base station in a designated region. The sending unit 40 is configured to send the content source to the base station according to the storage request, and designate that the base station locally stores the content source after receiving the content source.

The service capability exposure function can directly interact with the third-party server, the service capability exposure function receives the content source sent by the third-party server, and the third-party server can instruct the service capability exposure function to store the content source in a base station in a designated region. The service capability exposure function transmits the content source to the specified base station. The base station stores the content source locally, so that the terminals obtain the content source directly from the base station, and thus the transmission path is shortened, and the transmission delay is decreased, thereby solving the technical problem existing in the prior art that long-time delay occurs when transmitting data of the content source.

The service capability exposure function can store the content source in the base station in the designated region, and terminals within the covering scope of the base station which stores the content source, can download the content source directly from the base station when accessing the base station, and the transmission delay is then decreased, thereby solving the technical problem existing in the prior art that long-time delay occurs when transmitting data of the content source.

After receiving the storage request from the third-party server, the service capability exposure function firstly verifies whether the third-party server has storage permission. The service capability exposure function can verify the storage permission of the third-party server according to the third-party server's identity identifier. The identity identifier of the third-party server having storage permission can be stored locally in the service capability exposure function, and the service capability exposure function matches the identity identifier of the server which sends the storage request with the locally stored identity identifier. If the matching succeeds, the server that sends the storage request passes the verification, and the content requested by the storage request is allowed to be stored in the base station. The identity identifier of the third-party server may be pre-stored locally or may be queried interactively by the service capability exposure function with other functional entities, and the other functional entity may be a network device storing the identity identifiers of the third-party servers having storage permission.

When receiving storage requests of multiple third-party servers, the service capability exposure function may firstly determine whether the multiple storage requests have conflicts with respect to the requested storage time periods and the sizes of the content sources. If there is a conflict, a bidding system may be used to choose the storage request that is acceptable to the service capability exposure function. The service capability exposure function may send a notification of storage conflict to the third-party servers so that the multiple third-party servers coordinate on their own. The service capability exposure function may also send a request failure notification to the rejected third-party server so that the multiple third-party servers can change the storage strategies in time. When the third-party server passes the verification, the service capability exposure function sends a reply message to the server so as to inform the third-party server that the verification is passed and the storing can be implemented.

During the interaction between the service capability exposure function and the third-party server, the instruction information sent to each other and the carried content sources each are identified by a session identifier. The session identifier may be an identifier carried in the storage request sent by the third-party server. Since the session identifier is transmitted along with the instruction information and the content information among the third-party server, the service capability exposure function and the base station, it is possible to trace which server a certain content source is sent from and which content source a certain instruction is aimed at.

The third-party server may request that the content source be stored in a base station in a designated region. After the service capability exposure function receives the information of the designated region received from the third-party server, the service capability exposure function maps the information of the designated region to the base list covering the designated region, the base station list records the information of one or more base stations covering the designated region, such as the identification information of the base station and the like. The service capability exposure function may send the content source to the base station in the base station list before or at the beginning of the valid storage time requested by the third-party server, so as to instruct the base station to store the content source. The content source sent by the service capability exposure function includes information with respect of the content and size of the content source, and the service capability exposure function also sends information with respect of the valid storage time to the base station, so that the base station can provide the content source to terminals.

The service capability exposure function can obtain the information of the storage space of the base station by receiving the information of the storage space reported by the base station or actively querying the storage space of the base station, so that the service capability exposure function can determine whether the base station has the capability of storing the content source requested by the third-party server. The storage request sent by the third-party server may carry information of the size of the content source. The service capability exposure function determines whether to store the content source according to the size of the content source and the available storage space of the base station.

The third-party server can request for modifying the information such as the content source stored in the base station and the valid storage time, and request for modifying the base station that stores the content source. After receiving the modification request sent by third-party server, the service capability exposure function firstly determined whether the third-party server has an update permission, and if the third-party server has an update permission, the service capability exposure function firstly stores the update content requested by the third-party server.

For example, the storage request of the third-party server requests for storing the content source in the base station in region X, and then requests for storing the content source in the base station in region Y, or requests for canceling the stored content source in the base station in region X, or requests for modifying the time information of the stored content source in the base station in region X, etc. The service capability exposure function can transmit the update information to the base station in time, or transmit the update information before or at the beginning of the valid storage time.

Optionally, after updating the base station list, different types of update requests are sent according to different base stations recorded in the base station list. That is, after the service capability exposure function updates the base station list corresponding to the storage request according to the information of updating the designated region after receiving the request for updating the designated region, the method further includes: the service capability exposure function comparing the updated base station list with the base station list corresponding to the storage request so as to obtain the base station(s) which is not present in both the updated base station list and the base station list corresponding to the storage request; the service capability exposure function determining that the base station which is not present in both the updated base station list and the base station list corresponding to the storage request is a newly added base station added into the updated base station list or a deleted base station deleted from the base station list corresponding to the storage request; the service capability exposure function sending the information of updating the content source and/or the information of updating the valid storage time to the added base station(s) if the service capability exposure function determines the base station(s) is an newly added base station; the service capability exposure function sending the information of canceling the locking on the content source stored in the deleted base station(s) if the service capability exposure function determines the base station(s) is a deleted base station The information such as the valid storage time, the content and size of the content source, and the like of the original base station which is still in the base station list after updating can be updated; and a storage request can be sent for the base station newly added to the list to request for storing the information such as the valid storage time, the content source, and the like. Information of canceling the locking on the stored content source is sent to the base station(s) which is no longer present in the base station list after updating, and after receiving the information of canceling the locking, the base station(s) can delete the content sources and release the space of the base station(s), so as to store other content in the base station(s).

With the above-described embodiment, it is possible to store the content source to the base station in the designated region so that the terminals can obtain the content directly from the base station, thereby solving the problem that the transmission delay is relatively long in the prior art. Meanwhile, this embodiment may also specify the storage time of the content source in a certain base station, and the storage time may be the peak period during which the terminals access the content source, thereby improving the user experience. After the content source is stored, the valid storage time of the content source stored in the base station, and the content and size of the content source can also be updated, and also the base station for storing can be modified, which improves the flexibility of storing the content source. In addition, the content source stored in the base station can also be deleted to release the storage space of the base station, thereby optimizing the storage space and reducing storage costs for the third-party server.

Embodiment 3

Figure 7:
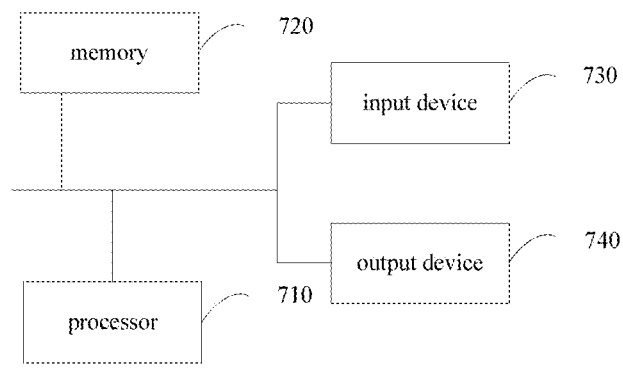
FIG. 7 illustrates a structural schematic diagram of an electronic equipment according to an embodiment of the present application.

FIG. 7 illustrates a structural schematic diagram of an electronic equipment according to embodiment 3 of the present application.

As shown in FIG. 7, the equipment includes at least one processor 710 and a memory 720, and it is taken as an example in FIG. 7 that only one processor 710 is provided.

The equipment that executes the data storage method may further include an input device 730 and an output device 740.

The processor 710, the memory 720, the input device 730, and the output device 740 may be connected by a bus or in other manners, and the bus connection is taken as an example in FIG. 7.

The memory 720, as a non-volatile computer-readable storage medium, may be used to store a non-volatile software program, a non-volatile computer-executable program and module, such as the program instruction/module corresponding to the data storage method in the embodiment of the present application. The processor 710 executes various functional applications and data processing of the server by running a non-volatile software program, instruction, and module stored in the memory 720, that is, the data storage method in the above-mentioned embodiment is realized.

The memory 720 may include a program storage area and a data storage area. The program storage area may store an operating system and at least one application program required by a function. The data storage area may store data created according to use of the service capability exposure function. In addition, the memory 720 may include a high-speed random access memory and may further include a non-volatile memory, such as at least one magnetic disk storage device, flash memory device, or other non-volatile solid-state storage device. In some embodiments, the memory 720 optionally includes a memory(s) which is remotely located with respect to the processor 710 and may be connected to the service capability exposure function via a network. Examples of the above-mentioned network include but are not limited to the internet, intranet, local area network, mobile communication network, and combinations thereof.

The input device 730 may receive the input numeric or character information and generate key signal input related to the user setting and function control of the service capability exposure function. The output device 740 may include a display device such as a display screen.

The at least one module is stored in the memory 720 and, when executed by the at least one processor 710, the data storage method in any of the above-mentioned method embodiments is executed.

The above-mentioned product can execute the method provided in the embodiment of the present application, and has the corresponding functional module and beneficial effects for executing the method. For technical details that are not described in the embodiment, reference can be made with respect to the method provided in the embodiment of the present application.

The electronic equipment in the present embodiment of the present application may be present in various forms, including but not limited to:

(1) Mobile communication device: Such device is characterized by having a mobile communication function and aiming to provide voice and data communication as a main target. Such terminal may be a smart cellphone (such as the iPhone), a multimedia phone, a feature phone, a low-end phone, etc.

(2) Ultra-mobile personal computer device: Such device belongs to the category of personal computers and has computing and processing functions, and generally also has a mobile internet access feature. Such terminal may be a PDA, MID and UMPC device, etc., such as the iPad.

(3) Portable entertainment device: Such device is able to display and play the multimedia content. Such device may be an audio/video player (such as the iPod), a handheld game player, an e-book, a smart toy, a portable vehicle navigation device, etc.

(4) Server: a device providing the computing service, the server consists of a processor, a hard disk, a memory, a system bus, etc. The server is similar to a general computer architecture, however, since it needs to provide a highly reliable service, a relatively high requirement is put forward in the processing capacity, stability, reliability, safety, scalability, manageability and other aspects.

(5) Other electronic apparatuses having the data interaction function.

Embodiment 4

Figure 8:
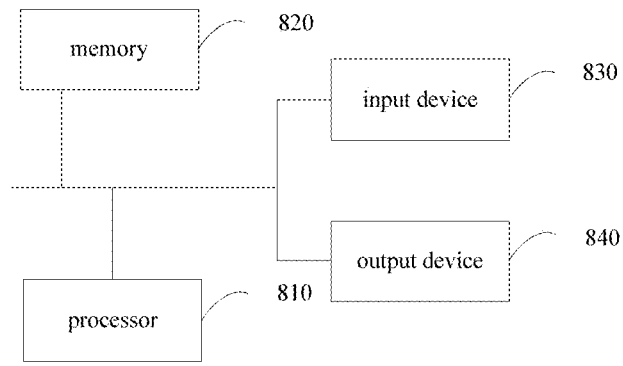
FIG. 8 illustrates a structural schematic diagram of an electronic equipment according to an embodiment of the present application.

FIG. 8 illustrates a structural schematic diagram of an electronic equipment according to an embodiment of the present application.

As shown in FIG. 8, the equipment includes at least one processor 810 and a memory 820, and it is taken as an example in FIG. 8 that only one processor 810 is provided.

The equipment that executes the data storage method may further include an input device 830 and an output device 840.

The processor 810, the memory 820, the input device 830, and the output device 840 may be connected by a bus or in other manners, and the bus connection is taken as an example in FIG. 8.

The memory 820, as a non-volatile computer-readable storage medium, may be used to store a non-volatile software program, a non-volatile computer-executable program and module, such as the program instruction/module corresponding to the data storage method in the embodiment of the present application. The processor 810 executes various functional applications and data processing of the server by running a non-volatile software program, instruction, and module stored in the memory 820, that is, the data storage method in the above-mentioned method embodiment is realized.

The memory 820 may include a program storage area and a data storage area. The program storage area may store an operating system and at least one application program required by a function. The data storage area may store data created according to use of the base station. In addition, the memory 820 may include a high-speed random access memory and may further include a non-volatile memory, such as at least one magnetic disk storage device, flash memory device, or other non-volatile solid-state storage device. In some embodiments, the memory 820 optionally includes a memory(s) which is remotely located with respect to the processor 810 and may be connected to the base station via a network. Examples of the above-mentioned network include but are not limited to the internet, intranet, local area network, mobile communication network, and combinations thereof.

The input device 830 may receive the input numeric or character information and generate key signal input related to the user setting and function control of the base station. The output device 840 may include a display device such as a display screen.

The at least one module is stored in the memory 820 and, when executed by the at least one processor 810, the data storage method in any of the above-mentioned method embodiments is executed.

The above-mentioned product can execute the method provided in the embodiment of the present application, and has the corresponding functional module and beneficial effects for executing the method. For technical details that are not described in the present embodiment, reference can be made with respect to the method provided in the embodiment of the present application. The electronic equipment in the present embodiment of the present application are present in various forms, including but not limited to:

(1) Mobile communication device: Such device is characterized by having a mobile communication function and aiming to provide voice and data communication as a main target. Such terminal may be a smart cellphone (such as the iPhone), a multimedia phone, a feature phone, a low-end phone, etc.

(2) Ultra-mobile personal computer device: Such device belongs to the category of personal computers and has computing and processing functions, and generally also has a mobile internet access feature. Such terminal may be a PDA, MID and UMPC device, etc., such as the iPad.

(3) Portable entertainment device: Such device is able to display and play the multimedia content. Such device may be an audio/video player (such as the iPod), a handheld game player, an e-book, a smart toy, a portable vehicle navigation device, etc.

(4) Server: a device providing the computing service, the server consists of a processor, a hard disk, a memory, a system bus, etc. The server is similar to a general computer architecture, however, since it needs to provide a highly reliable service, a relatively high requirement is put forward in the processing capacity, stability, reliability, security, scalability, manageability and other aspects.

(5) Other electronic equipment having the data interaction function.

The equipment embodiments described above are merely exemplary. The units described as separate components may or may not be physically separated. Components shown as units may or may not be physical units, that is, they may be located in one place, or they may be distributed to multiple network elements. Some or all of the modules may be selected according to actual needs to achieve the objectives of the solutions in the embodiments.

Based on the above description of the embodiments, those skilled in the art can clearly understand that the embodiments may be implemented by means of software plus a necessary universal hardware platform or hardware. Based on such understanding, the technical solutions described above, or their contribution to the prior art, may be embodied in the form of a software product, which can be stored in a computer-readable storage medium, such as a ROM/RAM, a diskette, an optical disc, etc., including some instructions for making a computer device (which may be a personal computer, a server, or a network device, or the like) execute the methods described in the embodiments or some parts of the embodiments.

Finally, it should be noted that, the above-described embodiments are merely for illustrating the technical solutions in the present application but not intended to provide any limitation. Although the present application has been described in details with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope the embodiments of the present application.

What is claimed is:

1. A data storage method, comprising steps of:

receiving, by a service capability exposure function, a storage request for storing a content source initiated by a third-party server into a base station in a designated region, wherein the storage request carries information of valid storage time of the content source; and sending, by the service capability exposure function, the content source to the base station according to the storage request, and instructing the base station to store the received content source locally, wherein the method further comprises steps of:

receiving, by the service capability exposure function, information of storage space sent by the base station according to a predetermined period, and sending, by the service capability exposure function, a request for querying the storage space to the base station; and updating, by the service capability exposure function, information of storage space of the base station recorded in the service capability exposure function, after the service capability exposure function receives the information of the storage space of the base station, wherein after the service capability exposure function sends the content source to the base station according to the storage request, the method further comprises steps of:

receiving, by the service capability exposure function, an update request sent by the third-party server, wherein the update request carries at least one update information selected from a group consisting of: information of updating the designated region, information of updating valid storage time, information of updating the content source, and information of canceling locking on a content source stored in the base station;

during a verification, verifying, by the service capability exposure function, storage permission of the third-party server;

locally storing, by the service capability exposure function, the at least one update information carried by the update request when the storage permission of the third-party server passes the verification.

2. The method according to claim 1, wherein the storage request carries storage information of information of the content source, wherein after the service capability exposure function receives the storage request for storing the content source from the third-party server into the base station in the designated region and before the service capability exposure function sends the content source to the base station according to the storage request, the method further comprises steps of:

during a verification, verifying, by the service capability exposure function, storage permission of the third-party server;

locally storing, by the service capability exposure function, the storage information carried by the storage request when the storage permission of the third-party server passes the verification, and sending, by the service capability exposure function, the storage information stored in the service capability exposure function to the base station before or at the beginning of the valid storage time.

3. The method according to claim 1, wherein the storage request further carries information of the designated region, wherein the step of sending, by the service capability exposure function, the content source to the base station according to the storage request comprises steps of:

mapping, by the service capability exposure function, the information of the designated region to a base station list covering the designated region; and sending, by the service capability exposure function, the content source to one or more base stations corresponding to the base station list before or at the beginning of the valid storage time.

4. The method according to claim 1, wherein when the storage permission of the third-party server passes the verification, the step of locally storing, by the service capability exposure function, the at least one update information carried by the update request comprises steps of:

updating, by the service capability exposure function, the base station list corresponding to the storage request according to the information of updating the designated region, after the service capability exposure function receives the information of updating the designated region;

locally storing, by the service capability exposure function, valid storage time instructed by the information of updating the valid storage time, after the service capability exposure function receives the information of updating the valid storage time; and locally storing, by the service capability exposure function, a content source instructed by the information of updating the content source, after the service capability exposure function receives the information of updating the content source.

5. A non-transitory computer storage device having computer-executable instructions stored therein, wherein the computer-executable instructions are configured for:

receiving a storage request for storing a content source initiated by a third-party server into a base station in a designated region, wherein the storage request carries information of valid storage time of the content source; and sending the content source to the base station according to the storage request, and instructing the base station to locally store the received content source, wherein the computer-executable instructions are further configured for:

receiving information of storage space sent by the base station according to a predetermined period, and sending a request for querying the storage space to the base station; and updating information of storage space of the base station recorded in the service capability exposure function, after the service capability exposure function receives the information of the storage space of the base station, wherein the computer-executable instructions are further configured for:

receiving an update request sent by the third-party server after the service capability exposure function sends the content source to the base station according to the storage request, wherein the update request carries at least one update information selected from a group consisting of: information of updating the designated region, information of updating valid storage time, information of updating the content source, and information of canceling locking on a content source stored in the base station;

during a verification, verifying storage permission of the third-party server; and locally storing the update information carried by the update request when the storage permission of the third-party server passes the verification.

6. The non-transitory computer storage device according to claim 5, wherein the storage request further carries storage information of information of the content source, wherein the computer-executable instructions are further configured for:

during a verification, verifying storage permission of the third-party server, after the service capability exposure function receives the storage request for storing the content source from the third-party server into the base station in the designated region and before the service capability exposure function sends the content source to the base station according to the storage request;

locally storing the storage information carried by the storage request when the storage permission of the third-party server passes the verification, and sending the storage information stored in the service capability exposure function to the base station before or at the beginning of the valid storage time.

7. The non-transitory computer storage device according to claim 5, wherein the storage request further carries information of the designated region, wherein said sending the content source to the base station according to the storage request comprises:
  mapping the information of the designated region to a base station list covering the designated region; and
  sending the content source to one or more base stations corresponding to the base station list before or at the beginning of the valid storage time.

8. The non-transitory computer storage device according to claim 5, wherein when the storage permission of the third-party server passes the verification, said locally storing the update information carried by the update request comprises:
  updating the base station list corresponding to the storage request according to the information of updating the designated region, after the service capability exposure function receives the information of updating the designated region;
  locally storing valid storage time instructed by the information of updating the valid storage time, after the service capability exposure function receives the information of updating the valid storage time; and
  locally storing a content source instructed by the information of updating the content source, after the service capability exposure function receives the information of updating the content source.

9. An electronic equipment, comprising:
  at least one processor; and
  a memory in communication with the at least one processor;
  wherein the memory stores instructions executable by the at least one processor, wherein the instructions are executed by the at least one processor, so that the at least one processor is capable of:
    receiving a storage request for storing a content source initiated by a third-party server into a base station in a designated region, wherein the storage request carries information of valid storage time of the content source; and
    sending the content source to the base station according to the storage request, and instructing the base station to locally store the received content source,
  wherein the at least one processor is further capable of:
    receiving information of storage space sent by the base station according to a predetermined period, and sending a request for querying the storage space to the base station; and
    updating information of storage space of the base station recorded in the service capability exposure function, after the service capability exposure function receives the information of the storage space of the base station,
  wherein the at least one processor is further capable of:
    receiving an update request sent by the third-party server after the content source is sent to the base station according to the storage request, wherein the update request carries at least one update information selected from a group consisting of: information of updating the designated region, information of updating valid storage time, information of updating the content source, and information of canceling locking on a content source stored in the base station;
    during a verification, verifying storage permission of the third-party server; and
    locally storing the update information carried by the update request when the storage permission of the third-party server passes the verification.

10. The electronic equipment according to claim 9, wherein the storage request further carries storage information of information of the content source, wherein the at least one processor is further capable of:
  during a verification, verifying storage permission of the third-party server, after the service capability exposure function receives the storage request for storing the content source from the third-party server into the base station in the designated region requesting and before the service capability exposure function sends the content source to the base station according to the storage request;
  locally storing the storage information carried by the storage request when the storage permission of the third-party server passes the verification, and sending the storage information stored in the service capability exposure function to the base station before or at the beginning of the valid storage time.

11. The electronic equipment according to claim 9, wherein the storage request further carries information of the designated region, wherein said sending the content source to the base station according to the storage request comprises:
  mapping the information of the designated region to a base station list covering the designated region; and
  sending the content source to one or more base stations corresponding to the base station list before or at the beginning of the valid storage time.

12. The electronic equipment according to claim 9, wherein when the storage permission of the third-party server passes the verification, said locally storing the update information carried by the update request comprises:
  updating the base station list corresponding to the storage request according to the information of updating the designated region, after the service capability exposure function receives the information of updating the designated region;
  locally storing the valid storage time instructed by the information of updating the valid storage time, after the service capability exposure function receives the information of updating the valid storage time; and
  locally storing the content source instructed by the information of updating the content source, after the service capability exposure function receives the information of updating the content source.

13. A service capability exposure apparatus, comprising:
  at least one processor; and
  a memory in communication with the at least one processor;
  wherein the memory stores instructions executable by the at least one processor, wherein the instructions are executed by the at least one processor, so that the at least one processor is capable of:
    receiving a storage request for storing a content source initiated by a third-party server into a base station in a designated region, wherein the storage request carries information of valid storage time of the content source; and
    sending the content source to the base station according to the storage request and for instructing the base station to locally store the content source after receiving the content source, wherein the at least one processor is capable of:
  receiving information of storage space sent by the base station according to a predetermined period, and sending a request for querying the storage space to the base station; and
  updating information of storage space of the base station recorded in the service capability exposure function, after the service capability exposure function receives the information of the storage space of the base station,
wherein the at least one processor is further capable of:
  receiving an update request sent by the third-party server after the content source is sent to the base station according to the storage request, wherein the update request carries at least one update information selected from a group consisting of: information of updating the designated region, information of updating valid storage time, information of updating the content source, and information of canceling locking on a content source stored in the base station;
  during a verification, verifying storage permission of the third-party server; and
  locally storing the update information carried by the update request when the storage permission of the third-party server passes the verification.

* * * * *